(12) United States Patent
Lam

(10) Patent No.: US 11,409,109 B1
(45) Date of Patent: Aug. 9, 2022

(54) GEOMETRIC PHASE LENS ALIGNMENT IN AN AUGMENTED REALITY HEAD MOUNTED DISPLAY

(71) Applicant: Facebook Technologies, LLC, Menlo Park, CA (US)

(72) Inventor: Wai Sze Tiffany Lam, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 260 days.

(21) Appl. No.: 16/898,864

(22) Filed: Jun. 11, 2020

Related U.S. Application Data

(63) Continuation of application No. 16/106,562, filed on Aug. 21, 2018, now Pat. No. 10,718,947, which is a continuation of application No. 15/484,422, filed on Apr. 11, 2017, now Pat. No. 10,120,193.

(60) Provisional application No. 62/451,483, filed on Jan. 27, 2017.

(51) Int. Cl.
*G02B 27/14* (2006.01)
*G02B 27/01* (2006.01)
*G02B 5/30* (2006.01)
*G02B 27/00* (2006.01)

(52) U.S. Cl.
CPC ....... *G02B 27/0172* (2013.01); *G02B 5/3083* (2013.01); *G02B 27/0093* (2013.01); *G02B 27/0179* (2013.01); *G02B 2027/0138* (2013.01); *G02B 2027/0147* (2013.01); *G02B 2027/0178* (2013.01); *G02B 2027/0187* (2013.01)

(58) Field of Classification Search
CPC .... G02B 2027/0112; G02B 2027/0178; G02B 27/01; G02B 27/0101; G02B 27/017; G02B 27/0172
USPC .......................................... 359/630; 345/7, 8
See application file for complete search history.

(56) References Cited

U.S. PATENT DOCUMENTS 10,120,193 B2    11/2018   Lam
2016/0011353 A1   1/2016   Escuti et al.

*Primary Examiner* — William Choi
(74) *Attorney, Agent, or Firm* — Fenwick & West LLP

(57) ABSTRACT

A HMD includes a display block. The display block combines light from a local area with image light to form an augmented scene. The display block also provides the augmented scene to an eyebox corresponding a location of a user's eye. The display block includes a waveguide display, a focusing assembly and a compensation assembly. The waveguide display emits the image light. The focusing assembly includes a focusing geometric phase lens and presents the augmented scene at a focal distance. The compensation assembly includes a compensation geometric phase lens that has an axis of orientation orthogonal to an axis of orientation of the focusing geometric phase lens. The compensation assembly compensates the optical power of the focusing assembly.

20 Claims, 6 Drawing Sheets

(Real World)

(Virtual Image Display)

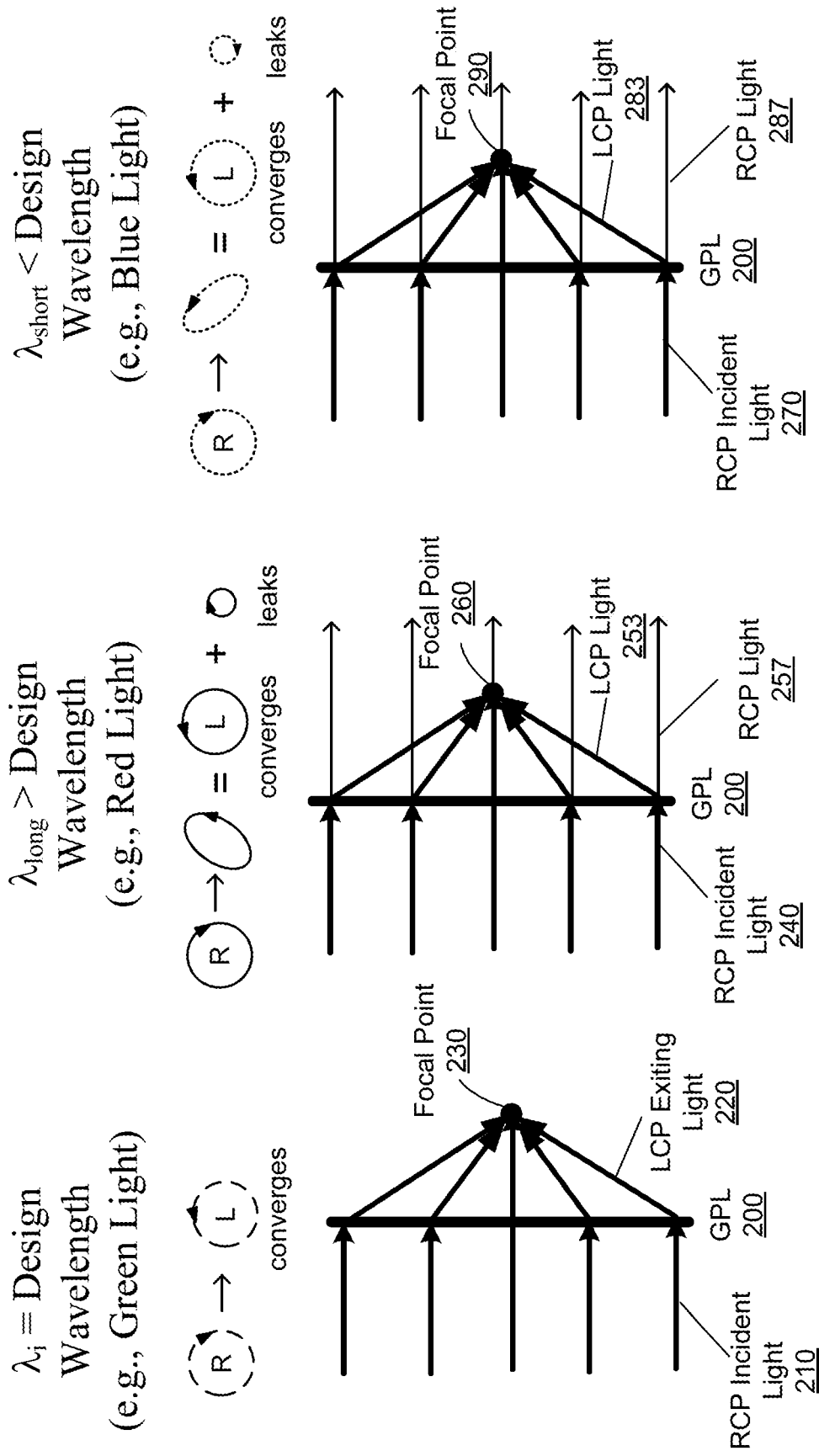

GEOMETRIC PHASE LENS ALIGNMENT IN AN AUGMENTED REALITY HEAD MOUNTED DISPLAY

CROSS REFERENCE TO RELATED APPLICATIONS

This application is a continuation application of Ser. No. 16/106,562, filed on Aug. 21, 2018, which is a continuation application of Ser. No. 15/484,422, filed on Apr. 11, 2017, now U.S. Pat. No. 10,120,193, which claims the benefit of U.S. Provisional Application No. 62/451,483, filed on Jan. 27, 2017, which are incorporated by reference in their entirety.

BACKGROUND

The present disclosure generally relates to compensating focusing power in imaging optics, and specifically to use of geometric phase lenses in augmented reality (AR) head mounted displays (HMD).

An AR headset displays virtual image overlapping with image of a local area surrounding the AR headset. The virtual image is usually generated by computer. Some AR headsets use geometric phase lenses (GPLs) as focusing-optics. A GPL is an optical half-wave plate (HWP) with spatially varying optic-axis. A GPL is designed for a particular wavelength, e.g., the wavelength in a particular color band. For light having the designed wavelength, if it enters the GPL as left handed circularly polarized (LCP) light, it exits the GPL as right handed circularly polarized (RCP) light, or vice versa. There is no leakage of the light. However, for light not having the designed wavelength, circularly polarized light exits the GPL as elliptically polarized light with leakage. Thus, the focusing power of the GPLs can produce large amount of color dispersion, making an AR headset unusable, especially when used in see-through to view the local area.

SUMMARY

An AR HMD includes a display block. The display block is configured to combine image light and light from a local area surrounding the AR HMD to form an augmented scene and provide the augmented scene to an eyebox corresponding a location of a user's eye. The display block includes a waveguide display, a focusing assembly, and a compensation assembly. In some embodiments, the display block may also include a controller that controls the focusing assembly and compensation assembly.

The waveguide display is configured to emit image light. The focusing assembly is located between the waveguide display and the user's eye. It has focusing optical power and is configured to present the augmented scene at a focal distance. For example, the focusing assembly focuses light from the waveguide display at one or more finite distances from the user's eye. The focusing assembly comprises one or more geometric phase lenses (GPLs). Each of the one or more GPLs has a respective axis of orientation. An axis of orientation of a GPL is an axis that orients a GPL. An example axis of orientation may be, e.g., a slow axis of the GPL, a fast axis of the GPL, or some axis that is fixed relative to the slow and fast axes of the GPL. A GPL has different retardances for light with different wavelengths, which causes color dispersion. The color dispersion alters light from the local area (i.e., real world) and degrades see-through quality of the AR HMD.

The compensation assembly is configured to compensate for the optical power of the focusing assembly. The compensation assembly includes one or more GPLs. Each GPL of the compensation element has an axis of orientation orthogonal to the axis of orientation of a GPL of the focusing assembly. The orthogonal alignment compensates the focusing power of the focusing assembly and eliminates color dispersion.

The orthogonal alignment can be applied to a multilayer GPL, where each layer is configured to have half-wave retardance for a particular wavelength but one-wave retardance for other wavelengths. Accordingly, the multilayer GPL not only presents image at a focal distance but also corrects axial chromatic aberration between design wavelengths of the multilayer GPL. Also, the orthogonal alignment can be applied to a GPL stack with switchable focal length. The GPL stack includes one or more GPLs and one or more HWPs with switchable focal length. The GPL stack therefore can present image light at multi-focal planes.

BRIEF DESCRIPTION OF THE DRAWINGS

FIG. 2A illustrates an example of a GPL, associated with a design wavelength, acting on incident light of the design wavelength, in accordance with an embodiment.

FIG. 2B illustrates the GPL of FIG. 2A acting on incident light that has a longer wavelength than the design wavelength, in accordance with an embodiment.

FIG. 2C illustrates the GPL of FIG. 2A acting on incident light that has a shorter wavelength than the design wavelength, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Vergence-Accommodation Conflict

Figure 1A:
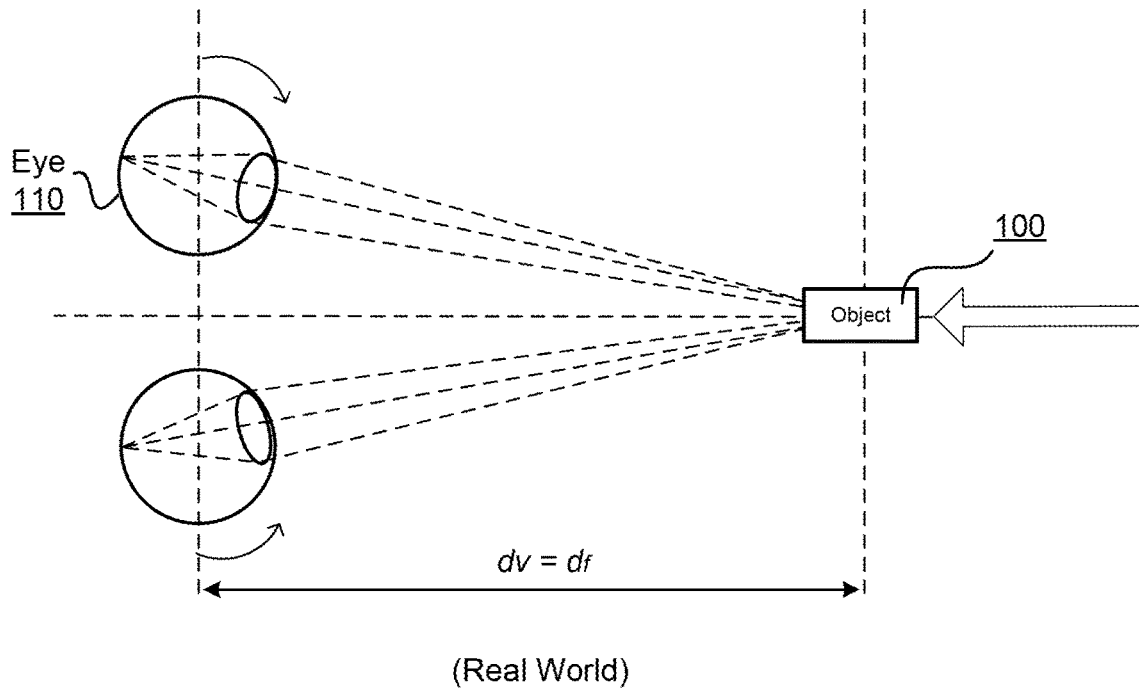
FIG. 1A shows an example of how a human eye experiences vergence and accommodation in the real world.

Vergence-accommodation conflict is a problem in many AR HMD systems, where computer generated image is displayed to overlap with the real world. Vergence is the simultaneous movement or rotation of both eyes in opposite directions to obtain or maintain single binocular vision and is connected to accommodation of the eye. Under normal conditions, when human eyes look at a new object at a distance different from an object they had been looking at, the eyes automatically change focus (by changing their shape) to provide accommodation at the new distance or vergence depth of the new object. FIG. 1A shows an example of how a human eye 110 experiences vergence and accommodation in the real world. In the example of FIG. 1A, the user is looking at a real object 100 (i.e., an object in the real world). The user's eyes 110 are verged on the real object 100 and gaze lines from the user's eyes 110 intersect at the real object 100. As the real object 100 is moved closer to the user, as indicated by the arrow in FIG. 1A, each eye 110 rotates inward (i.e., convergence) to stay verged on the real object 100. As the real object 100 gets closer, the eye 110 "accommodates" for the closer distance by changing its shape to reduce the power or focal length. Thus, under normal conditions in the real world, the vergence depth ($d_v$) equals the focal length ($d_f$).

Figure 1B:
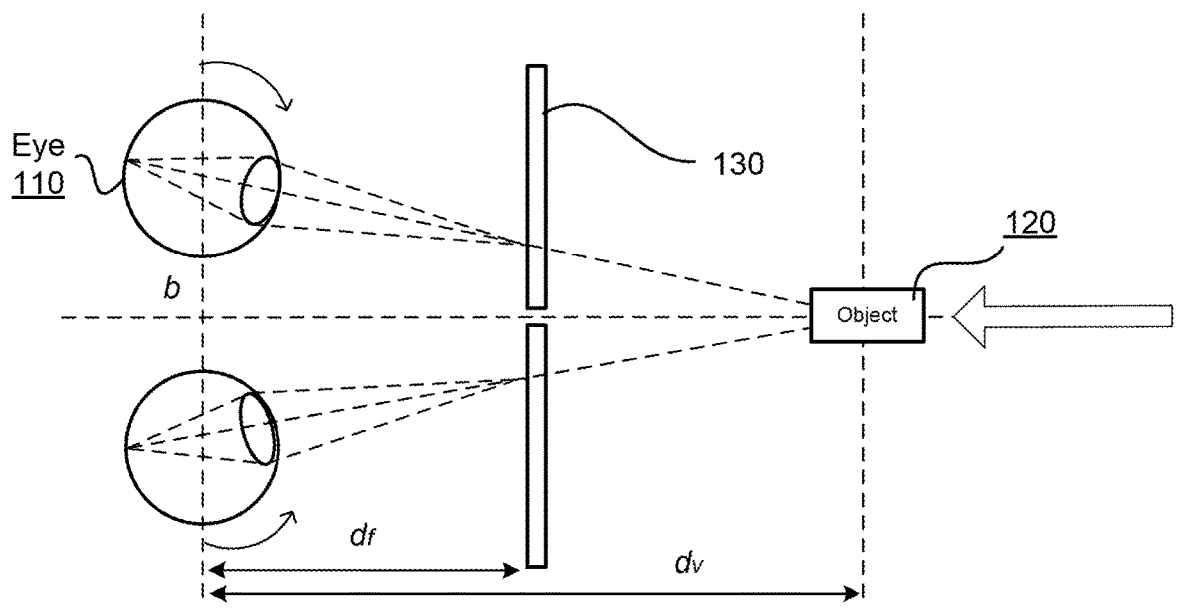
FIG. 1B shows an example conflict between vergence and accommodation that can occur with virtual image display.

FIG. 1B shows an example conflict between vergence and accommodation that can occur with virtual image display. In this example, a user is looking at a virtual object 120 (e.g., an object in virtual image) displayed on an electronic screen 130; however, the user's eyes are verged on and gaze lines from the user's eyes intersect at virtual object 120, which is a greater distance from the user's eyes than the electronic screen 130. As the virtual object 120 is rendered on the electronic display 130 to appear closer to the user, each eye 110 again rotates inward to stay verged on the virtual object 120, but the power or focal length of each eye is not reduced; hence, the user's eyes do not accommodate as in FIG. 1A. Thus, instead of reducing power or focal length to accommodate for the closer vergence depth, each eye 110 maintains accommodation at a distance associated with the electronic display 130. Thus, the vergence depth ($d_v$) often does not equal the focal length ($d_f$) for the human eye for objects displayed on 3D electronic displays. This discrepancy between vergence depth and focal length is referred to as "vergence-accommodation conflict." A user experiencing vergence or accommodation, but not both can eventually experience some degree of fatigue and nausea, which is undesirable for AR HMD system creators.

To create comfortable viewing experience, virtual image generated by an AR HMD needs to be displayed at the right distance for the eye accommodations of real world objects at different time. One way to display virtual image at a finite distance is to direct light from a projector into a waveguide. A focusing assembly is placed between the waveguide and the eye to focus the image out-coupled from the waveguide at a finite distance. Other than seeing virtual image, the user of an AR HMD also needs to see the real world unaltered. Therefore, a compensating assembly, having an optical power that compensates the optical power of the focusing assembly, should be placed after the waveguide.

Geometric Phase Lens

In some embodiments, the focusing assembly includes one or more GPLs. A GPL is an optical HWP with spatially varying optic axis. A GPL adds or removes optical power based in part on a polarization of incident light. For example, if RCP light is incident on a GPL, the GPL acts as a positive lens (i.e., it causes light to converge), or if LCP light is incident on the GPL, the GPL acts as a negative lens (i.e., it causes light to diverge). As discussed in more detail below, the GPL may also reverse a handedness of the incident light before outputting it (e.g., changing LCP to RCP or vice versa). A GPL may be a good choice for imaging optics in an ergonomic AR HMD system. A single layer GPL is relatively thin, as it is providing half-wave retardance. Additionally, efficiency may be increased using, e.g., a multi-layer GPL or a GPL stack. But, the increase in thickness is relatively minimal as it is on the order of several microns.

Because a GPL is a form of a HWP, its focusing mechanism operates on RCP (or LCP) light and forms LCP (or RCP) image, respectively. The focal length f of a GPL is determined by the spatial distribution of the optic-axis $\phi(r)$ and the wavelength $\lambda$ of incident light. In one embodiment, the focal length f of a GPL is linearly proportional to the wavelength $\lambda$ of the incident light. For example, $$\phi(r) \approx \frac{\pi r^2}{2f\lambda} \tag{1}$$

where r is radius of a circle where the optical axis is located; f is the focal length; $\pi$ is a constant (i.e., commonly approximated as 3.14159); and $\lambda$ is the wavelength of incident light.

Accordingly, a GPL is usually designed for a specific light wavelength, i.e., the designed wavelength. If the incident light is at the designed wavelength, LCP light becomes RCP light, or vice versa. If the incident light is not at the designed wavelength, it exits as elliptically polarized light with light leakage due to the non-half-wave thickness for the wavelength of the incident light. Also, focal lengths of the different wavelengths vary linearly with the wavelengths. Therefore a single layer GPL has color dispersion. Color dispersion is separation in light at different wavelengths while passing through the single layer GPL because a fixed spatial distribution of optic-axis $\phi(r)$ produces different focal lengths for different wavelengths.

FIG. 2A illustrates an example of a GPL 200, associated with a design wavelength, acting on RCP incident light 210 ($\lambda_i$) of the design wavelength, in accordance with an embodiment. For ease of illustration, in this example, the design wavelength is 550 nm which is perceived as green light. However, in other embodiments, the GPL 200 may be associated with some other design wavelength, moreover, the design wavelength may be outside of a visible band, e.g., the design wavelength may be in an infrared band.

As noted above, the GPL 200 is a HWP. Accordingly, in acting on RCP incident light 210 the GPL 200 reverses the handedness of polarization such that exiting light 220 is LCP. Moreover, as RCP the incident light 210 is collimated, the GPL 200 focuses the existing light 220 at a focal point 230, generating a LCP image. There is no light leakage because a wavelength of the RCP incident light 210 matches the design wavelength for the GPL 200.

FIG. 2B illustrates the GPL 200 of FIG. 2A acting on incident light 240 ($\lambda_{long}$) that has a longer wavelength than the design wavelength, in accordance with an embodiment. For ease of illustration, in this example, the incident light 240 has a wavelength of 630 nm and is perceived as red light. However, in other embodiments, the incident light 240 may be associated with some other wavelength that is longer than the design wavelength.

The incident light 240 is RCP and collimated. As the incident light 240 is not at the designed wavelength of the GPL 200, the incident light 240 exits the GPL 200 as left handed elliptically polarized light. As shown in FIG. 2B, the left handed elliptically polarized light is a combination of LCP light 253 and RCP light 257. As the incident light 240 is collimated, the LCP light 253 converges to a focal point 260, where a LCP image is formed. However, the focal point 260 for the longer wavelength is further away from the GPL 200 than the focal point 230 for the design wavelength. The RCP light 257 passes straight through the GPL 200 without focusing and acts as light leakage.

On one hand, the different focuses at different wavelengths produce color dispersion. On the other hand, light leakage can, e.g., reduce contrast in an image being presented to a user. The amount of leakage (e.g., the RCP light 257) depends on the thickness of the GPL (e.g., the GPL 200). There is no leakage in cases where the GPL has a thickness corresponding to a half-wave retardance, $\delta=\pi$ radian, of the wavelength $\lambda$ of incident light (e.g., the RCP light 240). Retardance $\delta=2\pi/\lambda \times (\Delta n \times t)$ in radians, where $\Delta n$ is the material birefringence. Accordingly, for design wavelength $\lambda_i$, the physical thickness of the GPL is $\lambda_i/(2\times\Delta n)$. As the thickness of the GPL deviates from the half-wave retardance ($0<\delta<\pi$ or $\pi<\delta<2\pi$), the leakage increases cosinusoidally with inverse of the light wavelength $\lambda$. For example, the leakage (e.g., the RCP light 257) is $\cos^2(\delta/2)$ of the incident light, and the focusing light (e.g., the LCP light 253) is $\sin^2(\delta/2)$ of the incident light.

FIG. 2C illustrates the GPL 200 of FIG. 2A acting on incident light 270 ($\lambda_{short}$) that has a shorter wavelength than the design wavelength, in accordance with an embodiment. In the embodiment of FIG. 2C, the incident light 270 has a wavelength of 470 nm and therefore, is perceived as blue light. However, in other embodiments the incident light 270 may be associated with some other wavelength that is longer than the design wavelength.

The incident light 270 is RCP and collimated. Similar to the incident light 240 in FIG. 2B, the incident light 270 exits the GPL 200 as left handed elliptically polarized light, which is a combination of LCP light 283 and RCP light 287. The LCP light 283 converges to a focal point 290, where a LCP image is formed. However, the focal point 290 is closer to the GPL 200, as compared with the focal point 230 and focal point 260. Also, the RCP light 287 passes straight through, is not focused at the focal point 290, and acts as light leakage. As the wavelength of the red incident light 240 is longer than the designed wavelength of the GPL 200 while the wavelength of the blue incident light 270 is shorter than the designed wavelength, the red elliptically polarized lights has a different orientation from the blue elliptically polarized light.

Figures 3A, 3B, 3C:
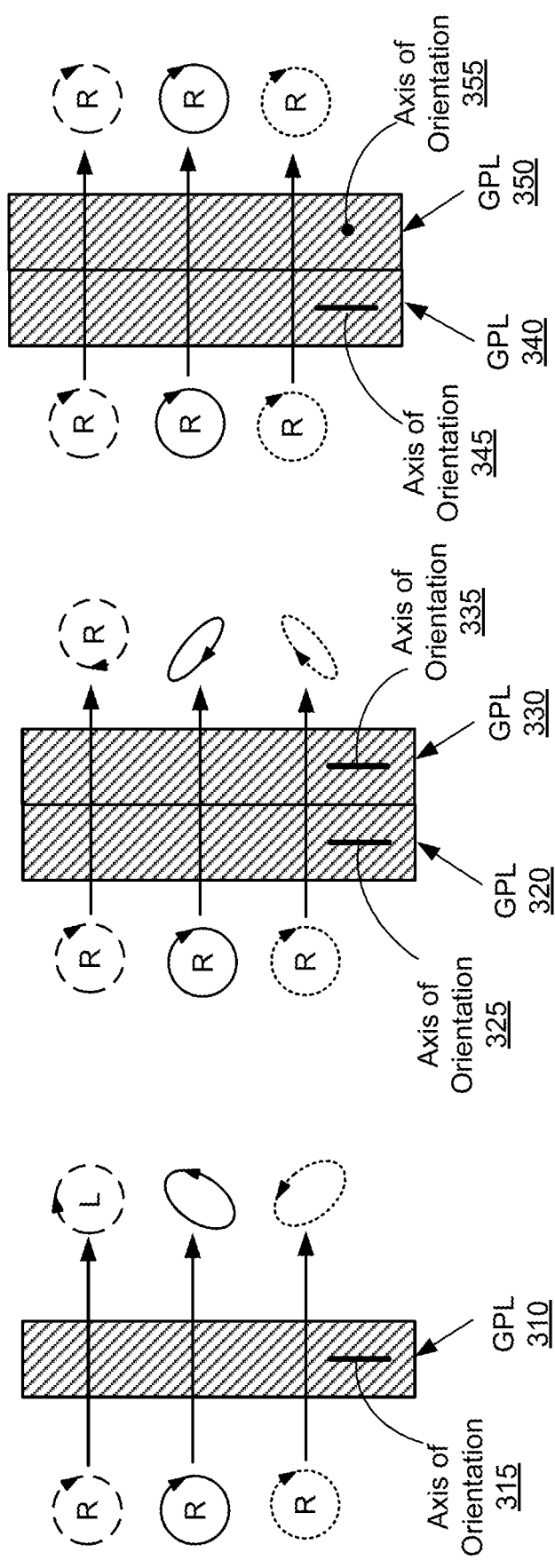
FIG. 3A illustrates a single layer GPL acting on light at a design wavelength of the GPL, light at a longer wavelength than the design wavelength, and light at a shorter wavelength than the design wavelength, in accordance with an embodiment.
FIG. 3B illustrates a stack of two GPLs with parallel orientations acting on light at a design wavelength of the GPLs, light at a longer wavelength than the design wavelength, and light at a shorter wavelength than the design wavelength, in accordance with an embodiment.
FIG. 3C illustrates a stack of two GPLs with orthogonal orientations acting on light at a design wavelength of the GPLs, light at a longer wavelength than the design wavelength, and light at a shorter wavelength than the design wavelength, in accordance with an embodiment.

Accordingly, a single layer GPL has different retardances and focal lengths for light at different wavelengths. The differences in retardance of a single layer GPL is illustrated in FIG. 3A. FIG. 3A shows an example of a single layer GPL 310 acting on light at the design wavelength of the GPL 310, light at a longer wavelength than the design wavelength, and light at a shorter wavelength than the design wavelength, in accordance with an embodiment. For ease of illustration, in the embodiments of FIGS. 3A-C, the design wavelength is 550 nm (e.g., green light); the longer wavelength is 630 nm (e.g., red light); and the shorter wavelength is 470 (e.g., blue light). However, in alternative embodiments, the design wavelength, longer wavelength and shorter wavelength may be some other wavelengths.

The GPL 310 has an axis of orientation 315 in the X direction. The GPL 310 is designed for the wavelength of 550 nm. Thus, the GPL 310 produces half-wave retardance for the green light, but produces less than half-wave retardance for the red light and more than half-wave retardance for the blue light. For example, the GPL 310 produces 0.4-wave retardance for the red light and 0.6-wave retardance for the blue light.

Consequently, the RCP green light exits the GPL 310 as LCP light, versus the red light and blue light exit the GPL 310 as elliptically polarized light. The differences in retardance of the GPL 310 can have two consequences. First, it causes axial focal shift, because the focal length of a GPL is highly dependent on wavelength. Second, it causes light leakage at wavelengths other than the design wavelength. In some embodiments, minimal leakage corresponds to a small bandwidth around the design wavelength. For example, for less than 0.01% leakage, the bandwidth around the design wavelength is less than approximately 7 nm. Thus, the differences in retardance of the GPL 310 can degrade see-through quality to local area image.

Compared with a single layer GPL, differences in retardance are larger for a GPL stack where multiple GPLs are aligned in arbitrary orientations. For example, when a first GPL (i.e., GPL1, which can be a GPL of the focusing assembly of an AR HMD) and a second GPL (i.e., GPL2, which can be a GPL of the compensation assembly of the AR HMD) are aligned in a way that their axes of orientations are parallel to each other, their retardance magnitude adds. The overall AR HMD system may become unusable, especially when used in see-through to view the real world.

FIG. 3B shows an embodiment of a stack of two GPLs 320 and 330 with parallel orientations acting on light at the design wavelength of the GPLs 320 and 330, light at a longer wavelength than the design wavelength, and light at a shorter wavelength than the design wavelength, in accordance with an embodiment.

The axis of orientation 325 of the GPL 320 and the axis of orientation 335 of the GPL 330 are both in the X direction. The green light that is transmitted by the GPLs 320 and 330, experiences half-wave retardance twice over, which is equal to one-wave retardance. Also, the amount of convergence caused by the GPL 320 is offset by the amount of divergence caused by the GPL 330. For example, when collimated RCP green light enters into the stack, the GPL 320 converges the RCP green light and converts it to converging LCP light but the GPL 330 diverges the converging LCP light and converts it back to parallel RCP light.

However, the combination of the two GPLs 320 and 330 does not produce one-wave retardance for other wavelengths. As discussed above, each GPL produces 0.4-wave retardance for the red light and 0.6-wave retardance for the blue light. Accordingly, the two GPLs 320 and 330 produce 0.8-wave retardance for the red light and 1.2-wave retardance for the blue light. Also, the red light and blue light exit each GPL with leakage that is not converged by the GPL 320, as discussed in FIG. 2B-C. Thus, the parallel alignment of the axes of orientation of the GPLs doubles the differences in retardance for light of the three colors and produces undesired focusing power.

A solution to the differences in retardance for light at different wavelengths is given in FIG. 3C. FIG. 3C shows an example of a stack of two GPLs with orthogonal orientations acting on light at a design wavelength of the GPLs, light at a longer wavelength than the design wavelength, and light at a shorter wavelength than the design wavelength, in accordance with an embodiment.

The GPL 340 has an axis of orientation 345 in the X direction; while the GPL 350 has an axis of orientation 355 in the Y direction. Due to the orthogonal alignment of the axes of orientation 345 and 355, the overall retardance of the two GPLs 340 and 350 is zero for any wavelength. The red light and blue light pass through each GPL with a polarization change. As shown in FIG. 3C, each of the RCP red, green and blue light exits the two GPLs 340 and 350 as RCP light. Even though the incident light in FIG. 3C is RCP, the combination of the two GPLs 340 and 350 has similar effects on LCP light. Because the combination of RCP and LCP generates unpolarized light, the GPL alignment shown in FIG. 3C also works for unpolarized light from a local area surrounding the AR HMD. Thus, local area light going through the GPLs 340 and 350 does not experience any retardance and exits without being altered. Accordingly, the GPLs 340 and 350 can ensure good see-through quality.

The differences in retardance for light of different colors can be illustrated using Jones calculus. The Jones matrix of the single layer GPL 310 in FIG. 3A with retardance δ and axis of orientation φ is shown in Equation (2):

$$LR(\delta, \phi) = \begin{pmatrix} e^{-\frac{i\delta}{2}}(\cos^2\phi + e^{-i\delta}\sin^2\phi) & -i\sin\left(\frac{\delta}{2}\right)\sin(2\phi) \\ -i\sin\left(\frac{\delta}{2}\right)\sin(2\phi) & e^{-\frac{i\delta}{2}}(e^{-i\delta}\cos^2\phi + \sin^2\phi) \end{pmatrix}, \quad (2)$$

where LR is the Jones matrix of a linear retarder; δ is retardance; φ is axis of orientation; i is the imaginary unit. The Jones matrix of the two GPLs 320 and 330 in FIG. 3B is shown in Equation (3):

$$LR(\delta, \phi) \cdot LR(\delta, \phi) = \begin{pmatrix} \cos(\delta) - i\cos(2\phi)\sin(\delta) & -i\sin(\delta)\sin(2\phi) \\ -i\sin(\delta)\sin(2\phi) & \cos(\delta) + i\cos(2\phi)\sin(\delta) \end{pmatrix}. \quad (3)$$

When δ=0, π, 2π, 3π, . . . , the Jones matrix of the two GPLs 320 and 330 become proportional to an identity matrix. In contrast, the Jones matrix of the two GPLs 340 and 350 is always the identity matrix show in Equation (4), regardless of the value of δ.

$$LR(\delta, \phi) \cdot LR(\delta, \phi + 90°) = \begin{pmatrix} 1 & 0 \\ 0 & 1 \end{pmatrix}. \quad (4)$$

The embodiment of FIG. 3C includes one pair of GPLs. In alternative embodiments, there can be multiple pairs of GPLs to increase efficiency in the focusing mechanism and minimize leakage. When there are multiple pairs of GPLs, there are more than one GPL for focusing and more than one GPL for compensating the focusing power of the focusing GPLs.

Application of GPL Alignment in AR HMDs

Figure 4A:
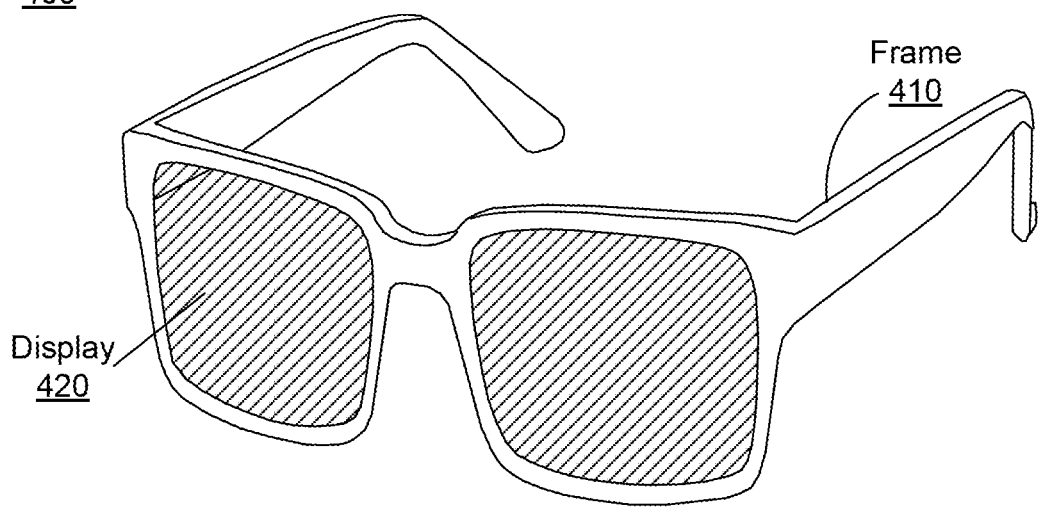
FIG. 4A is a diagram of an AR HMD, in accordance with an embodiment.

FIG. 4A is a diagram of an AR HMD 400, in accordance with an embodiment. The AR HMD 400 presents computer-generated media to a user and augments views of a physical, real-world environment with the computer-generated media. Examples of computer-generated media presented by the AR HMD 400 include one or more images, video, audio, or some combination thereof. In some embodiments, audio is presented via an external device (e.g., speakers and/or headphones) that receives audio information from the AR HMD 400, a console (not shown), or both, and presents audio data based on the audio information. In some embodiments, the AR HMD 400 may be modified to also operate as a virtual reality (VR) HMD, a mixed reality (MR) HMD, or some combination thereof.

The AR HMD 400 shown in FIG. 4A includes a frame 410 and a display 420. The frame 410 includes one or more optical elements which together display media to users. The display 420 is configured for users to see the content presented by the AR HMD 400. The display 420 includes at least one source assembly to generate an image light to present media to an eye of the user. The source assembly includes, e.g., a source, an optics system, or some combination thereof.

Figure 4B:
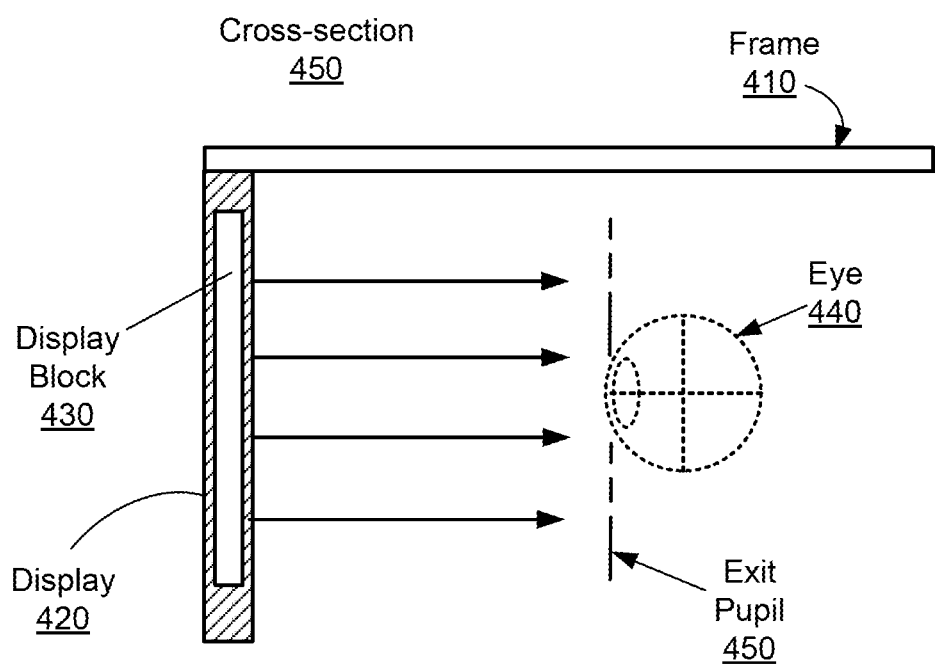
FIG. 4B is a cross-section of the AR HMD in FIG. 4A, in accordance with an embodiment.

FIG. 4B is a cross-section 450 of the AR HMD 400 in FIG. 4A, in accordance with an embodiment. The cross section 450 includes at least one display block 430, and an exit pupil 450. The exit pupil 450 is a location where the eye 440 is positioned when the user wears the AR HMD 400. In some embodiments, the frame 410 may represent a frame of eye-wear glasses. For purposes of illustration, FIG. 4B shows the cross section 450 associated with a single display block 430 and a single eye 440, but in alternative embodiments not shown, another display block which is separate from the display block 430 shown in FIG. 4B, provides image light to another eye of the user.

The display block 430, as illustrated below in FIG. 4B, is configured to combine light from a local area with light from computer generated image to form an augmented scene. The display block 430 is also configured to provide the augmented scene to an eyebox corresponding to a location of a user's eye 440 through the exit pupil 450. The eyebox is a region of space that would contain a user's eye while the user is wearing the HMD 400. The display block 430 may include, e.g., a waveguide display, a focusing assembly, a compensation assembly, or some combination thereof.

The waveguide display is configured to emit the image light. For example, the waveguide display includes one or more projectors, and an output waveguide. Light from the projector is expanded in at least one dimension (e.g., via another waveguide) and is coupled into the output waveguide via an input diffraction grating. The output waveguide includes two diffraction gratings that are on opposite sides of the output waveguide. The diffraction gratings are such that light entering the input waveguide exits the waveguide display at the same angle.

The focusing assembly presents image light at a first focal distance, in order to deliver to the user a comfortable experience of viewing the computer generated image. The focusing assembly has focusing optical power and is located between the waveguide display and the exit pupil 450. The focusing assembly includes one or more GPLs. Each of the GPLs is a HWP and has a respective axis of orientation.

The compensation assembly compensates for the optical power of the focusing assembly, in order to have light from the local area unaltered after going through the display block 430. In some embodiments, the compensation assembly includes one or more GPLs. Each GPL of the compensation assembly has an axis of orientation orthogonal to the axis of orientation of a GPL of the focusing assembly. The focusing assembly and compensation assembly may have the same number of GPLs.

In some embodiments, the focusing assembly and compensation assembly may also include one or more adjustable HWPs with switchable focal length. Accordingly, image light can be presented at multiple focal planes. The AR HMD 400 may include a controller controlling the focusing assembly and compensation assembly and an eye tracking system coupled to the controller. The eye tracking system determines eye tracking information for the eye 440. The determined eye tracking information may comprise information about an orientation of the eye 440 in an eye-box, i.e., information about an angle of an eye-gaze. For example, the eye 440 may be illuminated with a structured light. Then, the eye tracking system can use distortions in reflected structured light in a captured image to determine eye position and eye-gaze. For another example, the eye tracking system may determine eye position and eye-gaze based on magnitudes of image light captured over a plurality of time instants. The controller generates multi-focal instructions based on the eye tracking information, and provides the multi-focal instructions to the focusing assembly and compensation assembly for adjusting focus of the image light. More details about the controller are discussed in conjunction with FIG. 5.

The AR HMD 400 may include one or more other optical elements between the display block 430 and the exit pupil 450. The optical elements may act to, e.g., correct aberrations in image light emitted from the display block 430, magnify image light emitted from the display block 430, some other optical adjustment of image light emitted from the display block 430, or some combination thereof. The example for optical elements may include an aperture, a Fresnel lens, a convex lens, a concave lens, a filter, or any other suitable optical element that affects image light. The display block 430 may be composed of one or more materials (e.g., plastic, glass, etc.) with one or more refractive indices that effectively minimize the weight and widen a field of view of the AR HMD 400.

Figure 5:
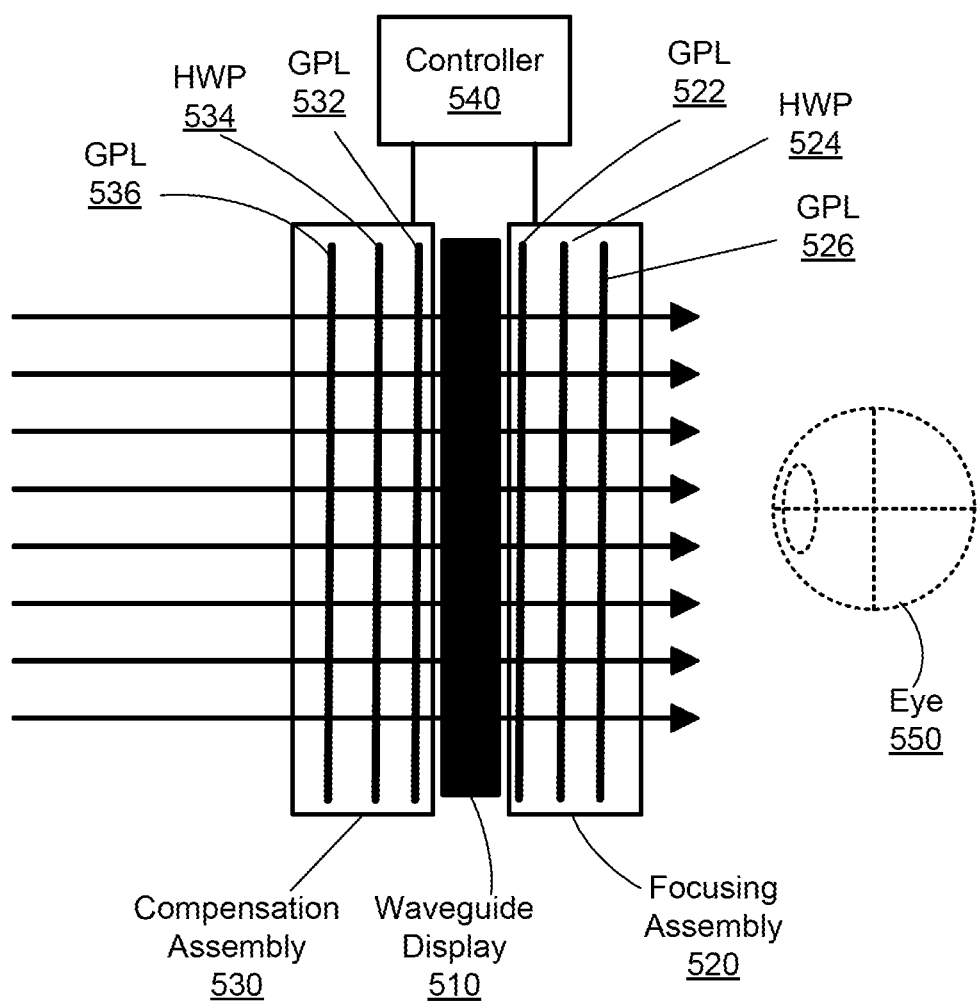
FIG. 5 shows an example of a multi-focal display block, in accordance with an embodiment.

FIG. 5 shows an example of a multi-focal display block 500, in accordance with an embodiment. The multi-focal display block 500 is a display block that can present image light at multiple focal planes (e.g., in order to minimize vergence-accommodation conflict). In one embodiment, the multi-focal display block 500 is an embodiment of the display block 430 discussed in conjunction with FIG. 4B. In alternate embodiments, the multi-focal display block 500 is part of some other HMD. The multi-focal display block 500 includes a waveguide display 510, a focusing assembly 520, a compensation assembly 530, and a controller 540.

The waveguide display 510 is configured to emit image light to present computer generate images to a user's eye 550. The waveguide display 510 includes one or more projectors, and an output waveguide. Image light from the projector is expanded in at least one dimension (e.g., via another waveguide) and is coupled into the output waveguide. Image light goes through the output waveguide and exits at the same angle. In some embodiments, the waveguide display includes a single projector that is scanned to create a 2D image. In alternate embodiments, the waveguide display includes one or more 2D projectors.

The focusing assembly 520 presents image light at a focal distance, in order to deliver to the user a comfortable experience of augmented image. The focusing assembly 520 is located between the waveguide display and the eye 550. The focusing assembly 520 includes two GPLs 522 and 526 and an adjustable HWP 524, each of which has a respective axis of orientation. Because the HWP 524 has adjustable retardance and provides switchable overall focal length between the GPLs 522 and 526, the focusing assembly 520 can focus the image light at multiple focal planes.

Image light goes through the GPL 522, HWP 524 and GPL 526 in sequence. Each of the GPLs 522 and 526 has two possible focal lengths, depending on the incident light's polarization. For example, the GPL 522 diverges RCP light with focal length $-f_1$ or focusing power $-\Phi_1=-1/f_1$, and converges LCP light with focal length $-f_1$ or focusing power $+\Phi_1=+1/f_1$. The HWP 524 has an adjustable retardance. For example, the HWP 524 can have two retardation state, a zero-retardation state where the HWP produces zero retardance and a half-wave retardation state where the HWP produces half-wave retardance. When the HWP 524 is adjusted to the zero-retardance state, RCP light passes through the HWP 524 as RCP light, and LCP light passes through the HWP 524 as LCP light. When HWP 524 is adjusted to the half-wave retardation state, it converts RCP light to LCP light and vice versa. The HWP 524 can be configured to change state in accordance with multi-focal instruction.

The focusing assembly 520, including the two GPLs 522 and 526 and the HWP 524, produces two distinctive focusing power for the computer generate image. For example, collimated RCP light from compute generated image exits the GPL 522 as diverging LCP light and then enters into the HWP 524. The HWP 524 may produce half-wave retardance, switching the diverging LCP light to diverging RCP light. The diverging RCP light then enters into the GPL 526, diverges even more and exits as LCP light. If the GPL 522 has focusing power $-\Phi_1$ and the GPL 526 has focusing power $-\Phi_2$, the exiting LCP light experiences a total focusing power of $-\Phi_1-\Phi_2$. Alternatively, the HWP 524 may produce zero-wave retardance and the LCP light exits the HWP 524 with unaltered polarization. The diverging LCP light then enters into the GPL 526, get converged slightly and exits as RCP light. This exiting RCP light experiences a total focusing power of $-\Phi_1+\Phi_2$. Therefore, due to the HWP 524, RCP light from computer generated image may exit the focusing assembly 520 as either LCP or RCP light at different focusing distances.

The compensation assembly 530 compensates for the optical power of the focusing assembly, in order to have light from the local area unaltered after going through the multi-focal display block 530. The compensation assembly 530 includes two GPLs 532 and 536 and an adjustable HWP 534.

The compensation assembly 530 and focusing assembly 520 form three compensation pairs: the first compensation pair including the GPL 522 and GPL 532, the second compensation pair including the HWP 524 and HWP 534, and the third compensation pair including the GPL 526 and GPL 536. The GPL 532 has the same focal length as the GPL 522; but their axes of orientation are orthogonal to each other. For example, the axis of orientation the GPL 522 is θ, while the orientation of the optic-axis of the GPL 532 is θ+90°. Similarly, the GPL 536 has the same focal length as the GPL 526 and their axes of orientation are orthogonal to each other. The HWP 534, similar to the HWP 524, has a zero-retardation state and a half-wave retardation state that affect which focal plane image light is presented. The state of the HWP 534 can be changed in accordance with multi-focal instructions. Its axis of orientation is orthogonal to the axis of orientation of the HWP 524.

The orthogonal alignment within each compensation pair compensates the focusing power of the focusing assembly 520 layer by layer and provides optical see-through quality. In some embodiments, the compensation starts from the inner compensation pair and ends with the outer compensation pair, i.e., happening first between the first compensation pair, then between the second compensation pair, and last the third compensation pair. Due to the compensation, light from the local area surround the AR HMD stays unaltered while going through the display block 500. The user's eye 550 can see the local area with good see-through quality. Also, the combination of the GPLs and adjustable HWPs produce focusing optics with switchable focal length and eliminates the leakage. The embodiment of FIG. 5 shows three compensation pairs. In alternative embodiments, the display block 500 can have a different number of pairs of GPLs and/or adjustable HWPs.

The controller 540 is coupled to and controls the focusing assembling 520 and the compensation assembly 530. Also, the controller 540 receives eye tracking information from an eye tracking system of the AR HMD. The eye tracking system tracks orientations of the eye 550. Based on the received eye tracking information, the controller 540 determines a gaze angle of the eye 550 and further determines a focal distance from the gaze angle. A focal distance (e.g., a virtual image plane) is selected from a plurality of available focal distances that are available to the multi-focal display block 500. In some embodiments, the selected focal distance, of the plurality of available focal distances, is a focal distance that is closest to the determined focal distance. In alternate embodiments, some other focal distance, of the plurality of available focal distances, is selected based at least in part on a predicted focal distance of the user's eyes. The controller 540 generates multi-focal instruction based on the selection of the focal distance and sends the multi-focal instruction to the focusing assembling 520 and the compensation assembly 530. For example, the multi-focal instruction controls the HWP 524 and HWP 534 to switch to a proper focal distance for the selected focal plane.

Figure 6:
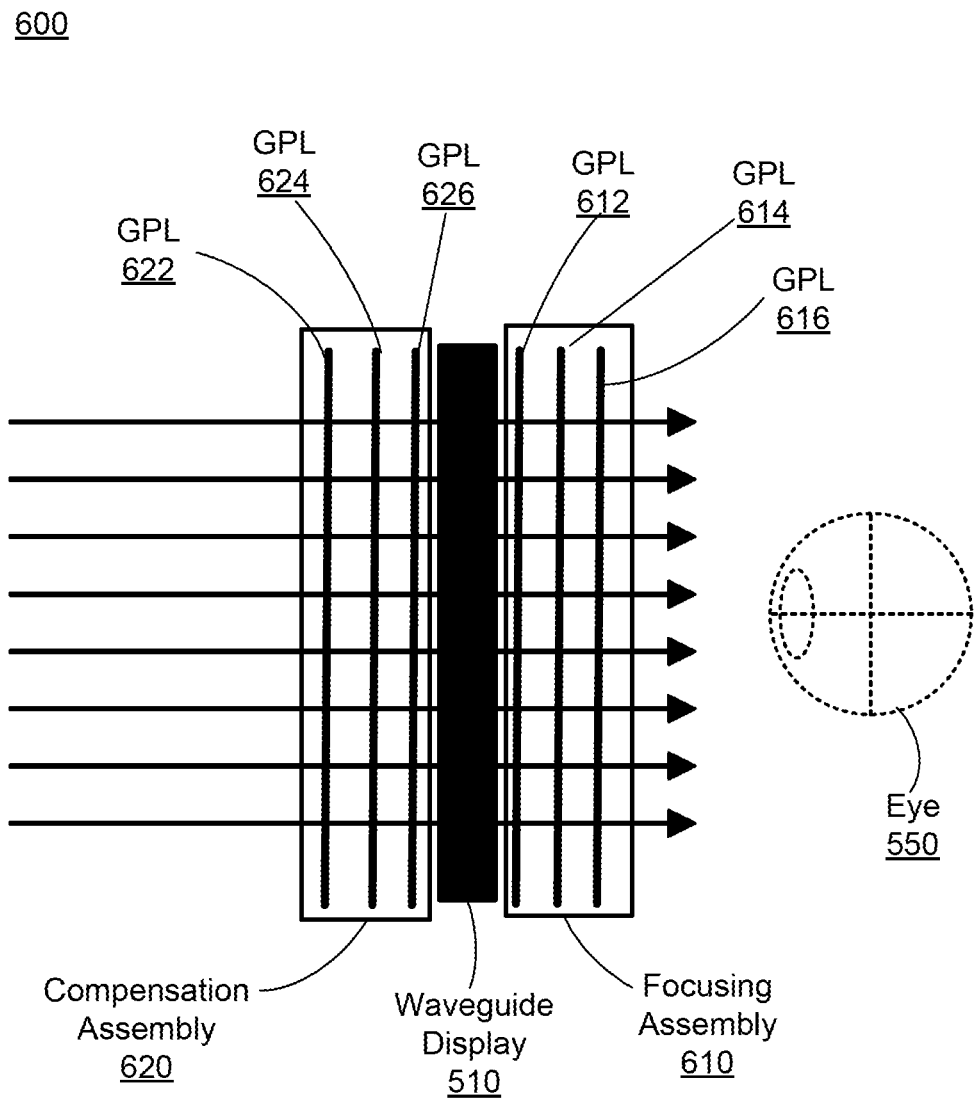
FIG. 6 shows an example of an apochromatic display block in accordance with an embodiment.

FIG. 6 shows an example of an apochromatic display block 600, in accordance with an embodiment. The apochromatic display block 600 presents image at a focal distance (not shown) and also corrects axial focus shift (i.e., axial chromatic aberration) between design wavelengths. In one embodiment, the apochromatic display block 600 is the display block 430 discussed in conjunction with FIG. 4B. In alternate embodiments, the apochromatic display block 600 may be some other display block. The apochromatic display block 600 includes the waveguide display 510, a focusing assembly 610, and a compensation assembly 620.

The focusing assembly 610 presents image at a focal distance (not shown) for the eye 550. The focal distance should be a right distance for the eye 550 to view the computer generated image comfortably. The focusing assembly 610 is located between the waveguide display 610 and the eye 550 and includes three GPLs 612, 614, and 616.

The focusing assembly 610 also corrects axial focus shift (i.e., axial chromatic aberration) between design wavelengths. In one embodiment, the designed wavelengths are 470 nm, 550 nm and 630 nm. For example, the GPL 612 has a thickness that is modulo of half-wave for wavelengths in a red light band (generally referred to as red light) and modulo of one-wave for wavelengths in green and blue light bands (generally referred to, respectively, as green light and blue light). Consequently, the GPL 612 focus red light but has no effect on green light or blue light. Likewise, the GPL 614 is configured to focus green light; and the GPL 616 is configured to focus blue light. Thus, the focusing assembly 610 makes the red, green and blue light focus at the same focal plane.

The thickness of the GPL 612 can be determined using:

$$L_1 + \frac{1}{2} = \frac{\lambda_R}{\Delta n_{1,R} t_1}; M_1 = \frac{\lambda_G}{\Delta n_{1,G} t_1}; N_1 = \frac{\lambda_B}{\Delta n_{1,B} t_1}, \quad (5)$$

where, $L_1$, $M_1$ and $N_1$ are integers; $\lambda_R$ is the wavelength in the red band; $\lambda_G$ is the wavelength in the green band; $\lambda_B$ is the wavelength in the blue band; $t_1$ is the thickness of the GPL 612; $\Delta n_{1,R}$ is birefringence for the wavelength in the red band; $\Delta n_{1,G}$ is birefringence for the wavelength in the green band; and $\Delta n_{1,B}$ is the birefringence for the wavelength in the blue band.

The thickness of the GPL 614 can be determined using:

$$L_2 = \frac{\lambda_R}{\Delta n_{2,R} t_2}; M_1 + \frac{1}{2} = \frac{\lambda_G}{\Delta n_{2,G} t_2}; N_2 = \frac{\lambda_B}{\Delta n_{2,B} t_2}, \quad (6)$$

where, $L_2$, $M_2$ and $N_2$ are integers; $\lambda_R$ is the wavelength in the red band; $\lambda_G$ is the wavelength in the green band; $\lambda_B$ is the wavelength in the blue band; $t_2$ is the thickness of the GPL 614; $\Delta n_{2,R}$ is birefringence for the wavelength in the red band; $\Delta n_{2,G}$ is birefringence for the wavelength in the green band; and $\Delta n_{2,B}$ is the birefringence for the wavelength in the blue band.

The thickness of the GPL 616 can be determined using:

$$L_3 = \frac{\lambda_R}{\Delta n_{3,R} t_3}; M_3 = \frac{\lambda_G}{\Delta n_{3,G} t_3}; N_3 + \frac{1}{2} = \frac{\lambda_B}{\Delta n_{3,B} t_3}, \quad (7)$$

where, $L_3$, $M_3$ and $N_3$ are integers; $\lambda_R$ is the wavelength in the red band; $\lambda_G$ is the wavelength in the green band; $\lambda_B$ is the wavelength in the blue band; $t_3$ is the thickness of the GPL 616; $\Delta n_{3,R}$ is birefringence for the wavelength in the red band; $\Delta n_{3,G}$ is birefringence for the wavelength in the green band; and $\Delta n_{3,B}$ is the birefringence for the wavelength in the blue band. For each GPL, an optimization is performed to vary $\Delta n_R$, $\Delta n_G$, $\Delta n_B$ and t in order to have all L, M and N close to an integer.

The compensation assembly 620 is configured to compensate optical power of the focusing assembly 610. The compensating assembly 670 includes three GPLs 622, 624, and 626. Each GPL has an axis of orientation orthogonal to the axis of orientation of a GPL of the focusing assembly 610. For example, the axis of orientation of the GPL 626 is orthogonal to the axis of orientation of the GPL 612; the axis of orientation of the GPL 624 is orthogonal to the axis of orientation of the GPL 614; and the axis of orientation of the GPL 622 is orthogonal to the axis of orientation of the GPL 616. Due to the orthogonal alignment, the optical power of the focusing assembly 610 is compensated. Therefore, the combination of the focusing assembly 610 and compensation assembly 620 delivers both good virtual image quality and good see-through quality.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A display block comprising:
   a focusing geometric phase lens configured to present visual content including light from a local area, wherein the light from the local area includes light at a first wavelength and light at a second wavelength, the second wavelength being different from the first wavelength; and
   a compensating geometric phase lens having an optical power that compensates for an optical power of the focusing geometric phase lens, and the compensating geometric phase lens is oriented relative to the focusing geometric phase lens such that respective retardances of the light at the first wavelength and the light at the second wavelength introduced by passing through the compensating geometric phase lens are offset by respective retardances of the light at the first wavelength and the light at the second wavelength introduced by passing through the focusing geometric phase lens.

2. The display block of claim 1, wherein the focusing geometric phase lens and the compensating geometric phase lens each has a half-wave retardance for the light at the first wavelength.

3. The display block of claim 2, wherein the first wavelength is 550 nm.

4. The display block of claim 1, wherein the focusing geometric phase lens and the compensating geometric phase lens each has a one-wave retardance for the light at the first wavelength.

5. The display block of claim 4, wherein the first wavelength is 550 nm.

6. The display block of claim 1, wherein the compensating geometric phase lens is oriented orthogonally to the focusing geometric phase lens.

7. The display block of claim 1, wherein the focusing geometric phase lens and the compensating geometric phase lens have a same focal length.

8. The display block of claim 1, further comprising:
   a first switchable half-wave plate; and
   a second switchable half-wave plate,
   wherein the first switchable half-wave plate and second switchable half-wave plate each having a zero-retardation state and a half-wave retardation state that affect which focal plane the visual content is presented, and are configured to change state in accordance with multi-focal instructions.

9. The display block of claim 1, wherein the visual content includes an augmented scene, and the display block is a component of a head-mounted display and is configured to provide the augmented scene to an eyebox of the head-mounted display corresponding a location of a user's eye.

10. The display block of claim 9, wherein the head-mounted display further comprises an eye tracking system that determines eye tracking information of a user's eye.

11. A display block comprises:
    a waveguide display configured to emit at least a portion of an image;
    a focusing geometric phase lens configured to present visual content including the portion of the image and light from a local area, wherein the light from the local area includes light at a first wavelength and light at a second wavelength, the second wavelength being different from the first wavelength; and
    a compensating geometric phase lens having an optical power that compensates for an optical power of the focusing geometric phase lens, and the compensating geometric phase lens is oriented relative to the focusing geometric phase lens such that respective retardances of the light at the first wavelength and the light at the second wavelength introduced by passing through the compensating geometric phase lens are offset by respective retardances of the light at the first wavelength and the light at the second wavelength introduced by passing through the focusing geometric phase lens.

12. The display block of claim 11, wherein the focusing geometric phase lens and the compensating geometric phase lens each has a half-wave retardance for the light at the first wavelength.

13. The display block of claim 12, wherein the first wavelength is 550 nm.

14. The display block of claim 11, wherein the focusing geometric phase lens and the compensating geometric phase lens each has a one-wave retardance for the light at the first wavelength.

15. The display block of claim 14, wherein the first wavelength is 550 nm.

16. The display block of claim 11, wherein the compensating geometric phase lens is oriented orthogonally to the focusing geometric phase lens.

17. The display block of claim 11, wherein the focusing geometric phase lens and the compensating geometric phase lens have a same focal length.

18. The display block of claim 11, further comprising:
a first switchable half-wave plate; and
a second switchable half-wave plate,
wherein the first switchable half-wave plate and second switchable half-wave plate each having a zero-retardation state and a half-wave retardation state that affect which focal plane the visual content is presented, and are configured to change state in accordance with multi-focal instructions.

19. The display block of claim 11, wherein the visual content includes an augmented scene, and the display block is a component of a head-mounted display and is configured to provide the augmented scene to an eyebox of the head-mounted display corresponding a location of a user's eye.

20. The display block of claim 19, wherein the head-mounted display further comprises an eye tracking system that determines eye tracking information of a user's eye.

* * * * *

UNITED STATES PATENT AND TRADEMARK OFFICE
CERTIFICATE OF CORRECTION

| | |
|---|---|
| PATENT NO. | : 11,409,109 B1 |
| APPLICATION NO. | : 16/898864 |
| DATED | : August 9, 2022 |
| INVENTOR(S) | : Wai Sze Tiffany Lam |

It is certified that error appears in the above-identified patent and that said Letters Patent is hereby corrected as shown below:

On the Title Page

In Column 2, item (57), under Abstract, Line 4, delete "corresponding a" and insert -- corresponding to a --, therefor.

In the Claims

In Column 14, Claim 9, Line 37, delete "corresponding a" and insert -- corresponding to a --, therefor.

In Column 15, Claim 19, Line 26, delete "corresponding a" and insert -- corresponding to a --, therefor.

Signed and Sealed this
Eighteenth Day of October, 2022

Katherine Kelly Vidal
*Director of the United States Patent and Trademark Office*